United States Patent
Braga et al.

(10) Patent No.: US 12,437,147 B2
(45) Date of Patent: Oct. 7, 2025

(54) SYSTEM AND METHOD FOR COMPLETING A FIELD IN A FORM-BASED APPLICATION

(71) Applicant: MEDIDATA SOLUTIONS, INC., New York, NY (US)

(72) Inventors: Daniel Braga, Carlsbad, CA (US); Stephen Parento, White Plains, NY (US)

(73) Assignee: MEDIDATA SOLUTIONS, INC., New York, NY (US)

( * ) Notice: Subject to any disclaimer, the term of this patent is extended or adjusted under 35 U.S.C. 154(b) by 35 days.

(21) Appl. No.: 18/324,085

(22) Filed: May 25, 2023

(65) Prior Publication Data

US 2023/0315976 A1  Oct. 5, 2023

Related U.S. Application Data

(63) Continuation of application No. 17/937,726, filed on Oct. 3, 2022.

(60) Provisional application No. 63/252,058, filed on Oct. 4, 2021.

(51) Int. Cl.
| | |
|---|---|
| *G06F 40/174* | (2020.01) |
| *G06F 3/0484* | (2022.01) |
| *G06F 40/134* | (2020.01) |
| *G06F 40/205* | (2020.01) |
| *G16H 10/60* | (2018.01) |
| *G16H 40/63* | (2018.01) |
| *G16H 40/67* | (2018.01) |

(52) U.S. Cl.
CPC .......... *G06F 40/174* (2020.01); *G06F 3/0484* (2013.01); *G06F 40/134* (2020.01); *G06F 40/205* (2020.01); *G16H 10/60* (2018.01)

(58) Field of Classification Search
None
See application file for complete search history.

(56) References Cited

U.S. PATENT DOCUMENTS

| | | | |
|---|---|---|---|
| 2003/0014489 A1 | 1/2003 | Inala et al. | |
| 2011/0033034 A1* | 2/2011 | Mani | H04M 3/56 379/202.01 |
| 2012/0102062 A1* | 4/2012 | Gurnani | G06Q 30/0603 707/769 |
| 2013/0060579 A1 | 3/2013 | Yu et al. | |

(Continued)

FOREIGN PATENT DOCUMENTS

| | | |
|---|---|---|
| JP | 2016-9236 A | 1/2016 |
| JP | 2021-12521 A | 2/2021 |

*Primary Examiner* — Mustafa A Amin
(74) *Attorney, Agent, or Firm* — STEPTOE LLP; Carl B. Wischhusen (57) ABSTRACT

A method for completing a field in a form-based application includes extracting form data and elements from a form within the form-based application, where the form data and elements relate to a first field, generating an input window containing the form data and elements, including a second field corresponding to the first field, receiving input regarding the second field for which to fill in text, data, or both text and data, receiving input from an external source from which to fill in the text and/or data, loading the filled-in text and/or data into the second field in the input window, and transferring the captured text and/or data to the first field within the form-based application.

20 Claims, 8 Drawing Sheets

(56) References Cited

U.S. PATENT DOCUMENTS

| | | | |
|---|---|---|---|
| 2014/0372866 A1* | 12/2014 | Tidhar | G06F 40/174 |
| | | | 715/234 |
| 2016/0063339 A1 | 3/2016 | Kwon et al. | |
| 2017/0171289 A1* | 6/2017 | Fausak | H04L 67/025 |
| 2017/0277773 A1 | 9/2017 | Iasi et al. | |
| 2018/0018428 A1* | 1/2018 | Coifman | G06F 16/27 |
| 2019/0394150 A1* | 12/2019 | Denoue | G06F 40/174 |
| 2022/0197965 A1* | 6/2022 | Devageorge | G10L 15/30 |
| 2022/0237567 A1* | 7/2022 | Tiwari | G06Q 10/1053 |

* cited by examiner

SYSTEM AND METHOD FOR COMPLETING A FIELD IN A FORM-BASED APPLICATION

CROSS-REFERENCE TO RELATED APPLICATION(S)

This application is a continuation of U.S. patent application Ser. No. 17/937,726, filed on Oct. 3, 2022, which claims the benefit of priority of United States Provisional patent application No. 63/252,058, filed on Oct. 4, 2021. The entire contents of the earlier applications are incorporated herein by reference.

BACKGROUND

The need to transfer data between disparate applications has existed for years. Some solutions have involved schemes to integrate the applications, others have involved manual data entry, and others involve features such as "drag and drop." But integrating disparate applications is often complicated, does not scale, and may require a separate solution for each integrative pair. Manual data entry is prone to errors. And features such as "drag and drop" often work only with applications that share a platform.

The need to transfer data also exists in the medical field, often with form-based applications. Attempts have been made to integrate electronic health records/electronic medical records (EHR/EMR) solutions and electronic data capture (EDC) solutions. These attempts have used various standards such as HL7, FHIR (a version of HL7), and CCDA, as well as APIs (application programming interfaces), but have also not been so successful due to the amount of implementation time required and the lack of ability to scale. Thus, other solutions are needed.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

As mentioned above, previous attempts to transfer data between and/or integrate various applications, including EHR/EMR and EDC applications, have not always been successful. The inventors have developed a system and method to address these issues using a browser plug-in (or browser extension), a WebSocket server, and a UI-based application that work together between a form-based application, such as an EDC program, and an external source to facilitate the transfer from the external source to the form-based application to complete fields in the form-based application ("complete" is used herein to mean fill in fields as well as complete or select drop-down lists or selections, checkboxes, radio buttons, etc.). The external source may be a second application such as an EHR/EMR system, a spreadsheet, an imaging system, or a document. The system and method manage the process of "handing off" the form field elements contained in the form-based application that allows a user to view the fields from the form-based application, capture the desired data from the external source, and insert the data directly back into the corresponding field in the form-based application. More specifically, the method identifies and extracts form data elements from the form-based application, synchronizes the elements with the browser plug-in (or browser extension), generates an input window containing one or more of the form elements, receives input from the user identifying the form field to be completed, receives text and/or data from the external source, and hands off the received text and/or data to the browser plug-in to insert the received text/data into the corresponding field within the form-based application.

Figure 1:
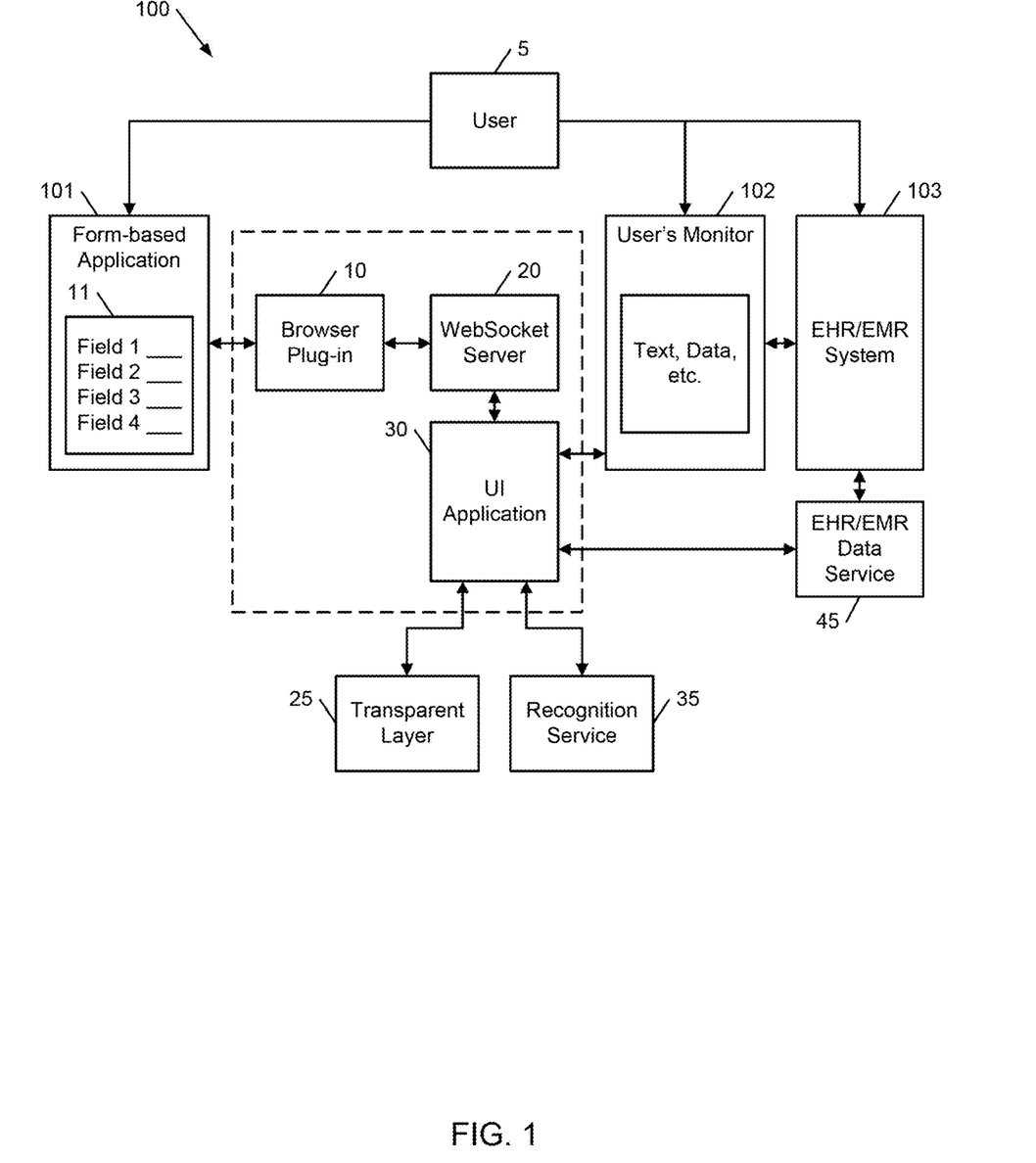
FIG. 1 is a block diagram of a system for completing fields in a form-based application, according to an embodiment of the present invention.

Reference is now made to FIG. 1, which is a block diagram of a system 100 for completing fields in a form-based application, according to an embodiment of the present invention. System 100 includes browser plug-in (or extension) 10, WebSocket server 20, and UI (i.e., user interface) application 30 that work together to hand off form elements from form-based application 101 to UI application 30, as well as capture the appropriate data from an external source, such as a second application on user's monitor 102 or an EHR/EMR system 103, and insert the data back into the corresponding form fields in form-based application 101. One of ordinary skill in the art would understand that the terms "browser plug-in," which may be in the form of an executable (i.e., object code), and "browser extension," which may be in the form of source code, both refer to software modules for modifying the functionality of a web browser. FIG. 1 also shows interactions between a user 5, form-based application 101, user's monitor 102, and EHR/EMR system 103 as well as interactions between UI application 30 and transparent layer 25, recognition service 35, and EHR/EMR data service 45.

Form-based application 101 may include any web-based form application, including an EDC application such as Medidata's Rave® EDC (and any of its companion, form-based applications and any other Medidata platform solutions), but the invention is certainly not limited to EDC applications or applications used in the clinical or medical fields. EHR/EMR system 103 may be a standalone system or application (Internet-based or resident on a user's computer). User's monitor 102 includes anything the user could view on a computer monitor. This may include one or more applications (web or installed) that a user may operate on his or her computer. Such applications may include EHR and EMR applications, but also includes other clinical or medical applications, as well as non-clinical applications, such as spreadsheets, PDF documents, word processing applications, form and non-form-based applications, web pages, etc., even the user's home screen image or wallpaper. Note that although form-based and other applications are described herein as operating on a computer, the invention is not limited to laptop or desktop-based applications, and may apply to applications operating on tablets or smartphones.

Figure 2A:
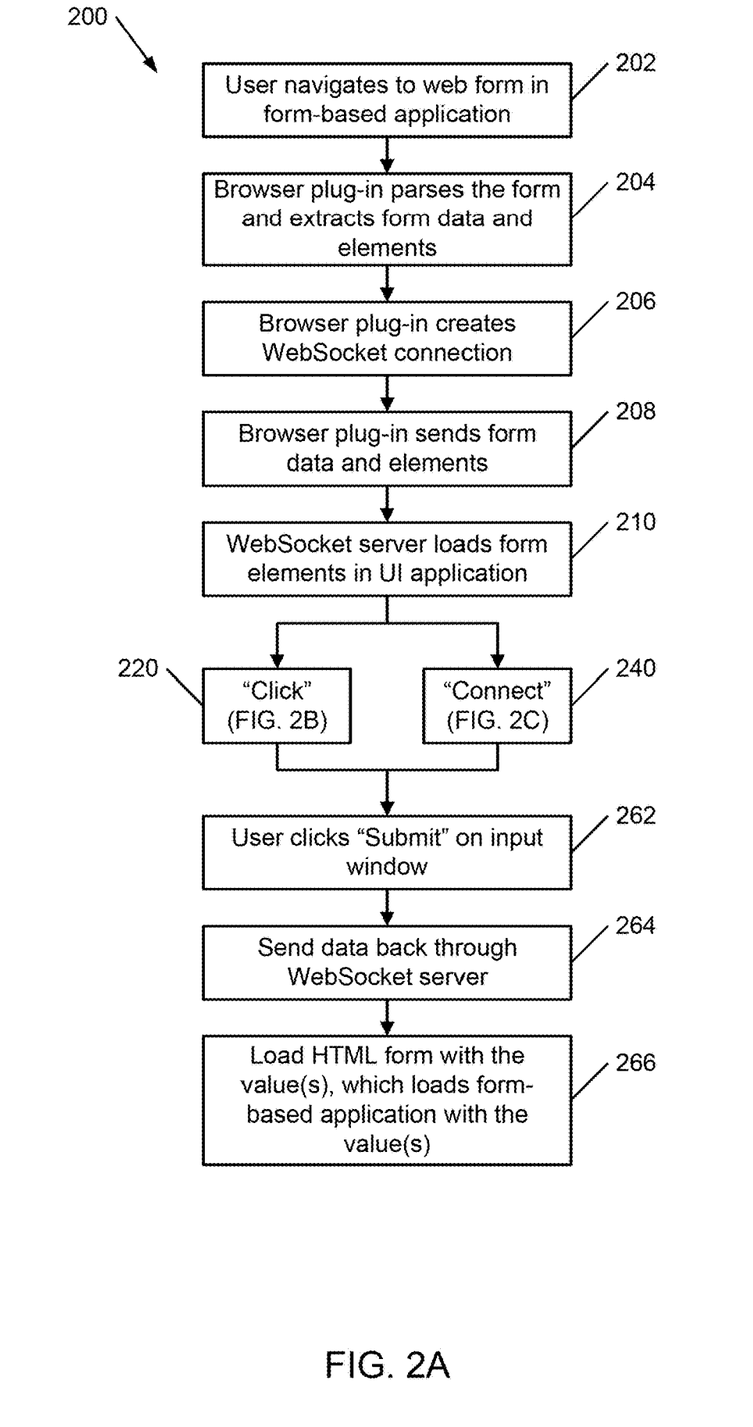
FIGS. 2A-2C are flowcharts of methods for completing fields in a form-based application, according to embodiments of the present invention.
Figure 2B:
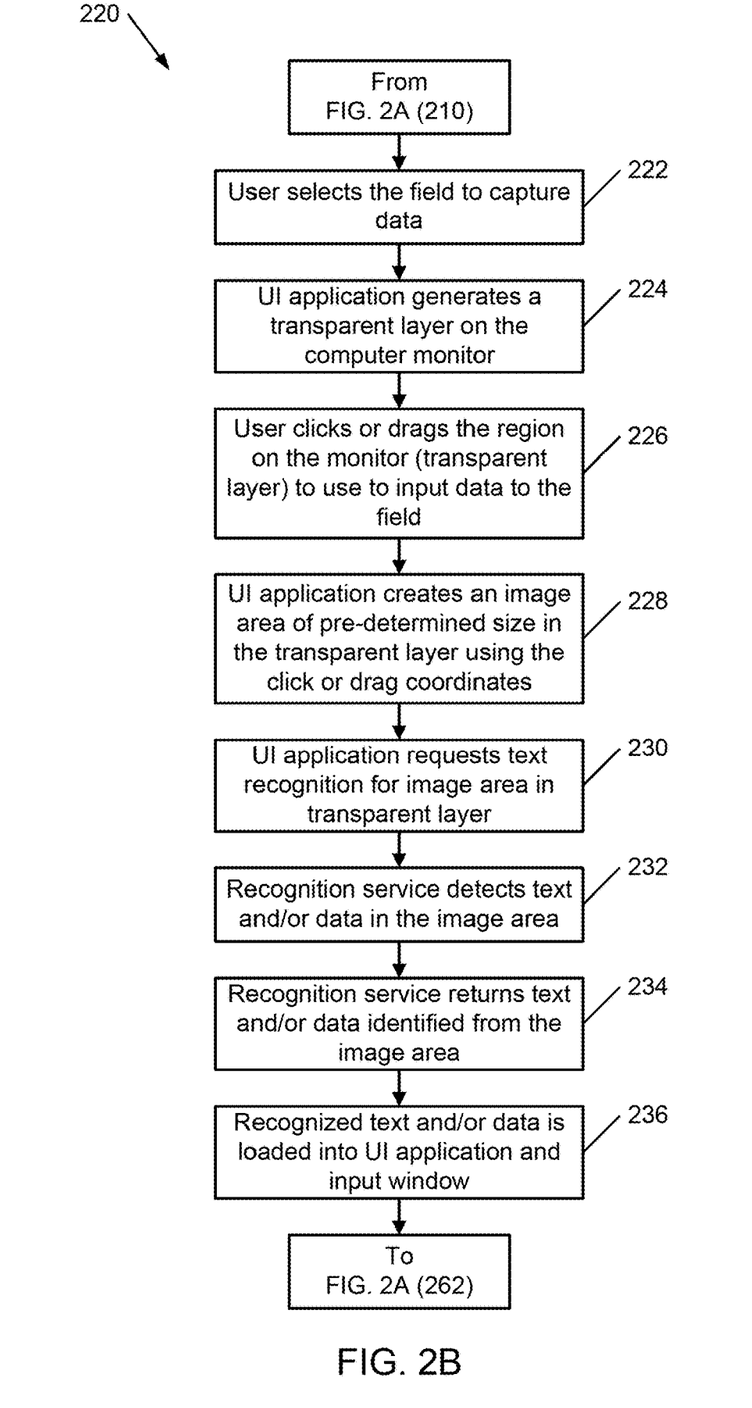
Figure 2C:
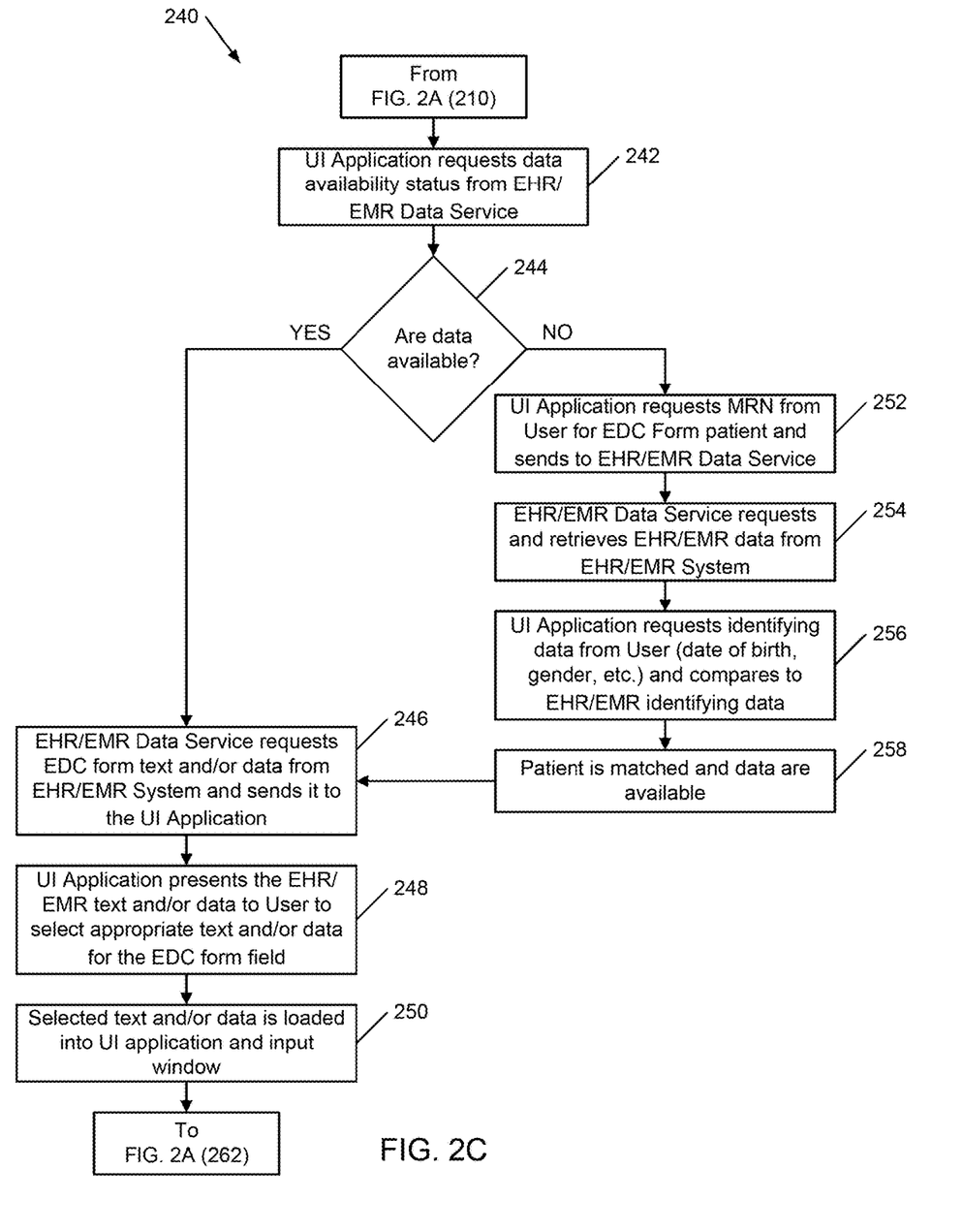

Reference is now made to FIGS. 2A-2C, which are flowcharts of two methods for completing fields in a form-based application, according to embodiments of the present invention. One method (the "click" method) involves the ability to click on an area in user's monitor 102 and transfer information within the clicked area to a form in the form-based application. The other method (the "connect" method) involves the ability to connect or link the form-based application and the EHR/EMR system directly to facilitate transfer of data and completion of the fields in the form-based application.

FIG. 2A shows flowchart 200, which includes operations common to both the "click" and "connect" methods. In operation 202, user 5 navigates to a page that includes a web form 11 in form-based application 101. Form 11 may be an HTML form and includes one or more fields that user 5 wants to complete. In the clinical context, the fields may be a clinical trial subject's vital signs, such as blood pressure, heart rate, temperature, weight, and height, or test results, such as protein, sodium, potassium, and chloride, as shown, for example, in FIG. 3A, which depicts a form 311 having four fields 301-304. In a non-clinical context, the fields may be tax or other financial information or job application information or any other type of form.

In operation 204, browser plug-in (or extension) 10, which operates in the background, identifies that form-based application 101 has been loaded into the web browser. Browser plug-in 10 parses form 11 and extracts form data and elements from form 11. Browser plug-in 10 may use the document object model (DOM) to find the form header data, description data, type of data field to be completed, drop-down lists, etc. —essentially anything that allows the user to complete the fields in the form. Form data may include items such as labels or form headings (i.e., name of form, text describing it) and descriptions of the data required for the form as well as drop-down box selection options. Form elements may include items such as indicators as to whether the data requested should be entered into a text box, checkbox, or radio button or selected from a drop-down list. In one embodiment, browser plug-in 10 can be registered to work with specific URLs, so that it operates on forms only from those URLs. Thus, browser plug-in 10 may operate on forms from "www.medidata.com," but may not operate on forms from "www.irs.gov," for example. In such a case, as part of operation 204, browser plug-in 10 checks the URL to ensure form-based application 101 is associated with a registered URL. In embodiments, the browser plug-in (or extension) 10 may be registered to work for specific users and may perform user authentication as part of operation 204.

Figure 3A:
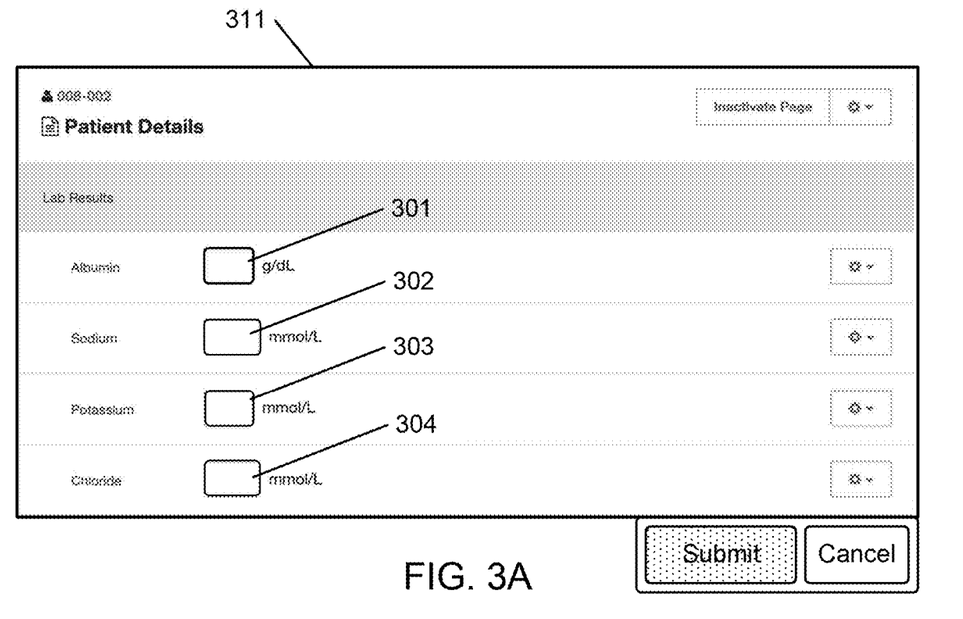
FIGS. 3A-3B show examples of elements from a form-based application before and after being filled in, according to an embodiment of the present invention.

FIG. 3A is an example of elements from form-based application 101 to be completed. For simplicity, form 311 includes four fields 301-304. These fields and labels are among those data and elements that browser plug-in (or extension) 10 parses and extracts.

In operation 206, browser plug-in (or extension) 10 creates a WebSocket connection to WebSocket server 20. WebSocket is a computer communications protocol that enables interaction between a web browser (or other client application) and a web server, but uses less overhead than HTTP (hypertext transfer protocol), although HTTP could be used. In operation 208, browser plug-in 10 sends form data and elements to WebSocket server 20. In operation 210, WebSocket server 20 loads form data and elements into UI application 30.

Figure 4A:
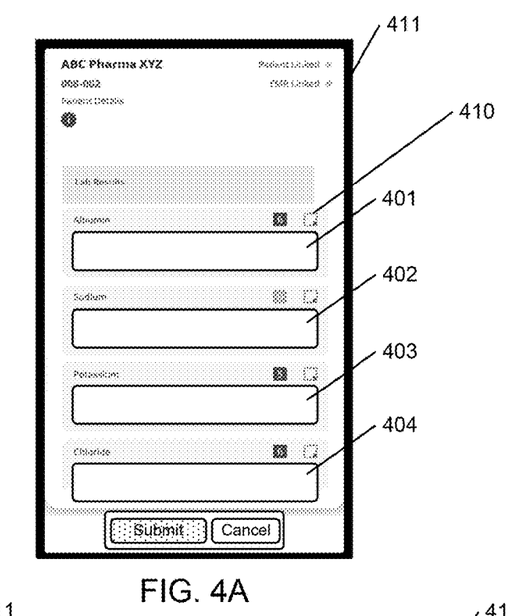
FIGS. 4A-4C show one method of using a generated input window to complete fields in the form-based application, according to an embodiment of the present invention.

At this point, the "click" and "connect" methods diverge. FIG. 2B shows flowchart 220, which includes operations for the "click" method. In this method, an input window is generated that is used to collect and transfer the data. FIG. 4A is an example showing how data and elements from form-based application 101 are used to generate such an input window to be completed. Input window 411 includes the same four fields that are in form 311 and provides a link between UI application 30 and form-based application 101. FIG. 4A shows icon 410 that indicates the "click" functionality is available—a user clicking on this icon activates the operations in which the user can then select a data point in the second application (e.g., an application on user's monitor 102 or EHR/EMR system 103). In operation 222, after clicking on icon 410, user 5 selects the field (401-404) in input window 411 to indicate which data are to be captured. This selection is nominally performed using a mouse (or other equivalent input method, such as a touchscreen), and user 5 first clicks the icon 410 above field 401 to indicate to system 100 that user 5 is going to select data to input to the Albumin field.

Figure 5A:
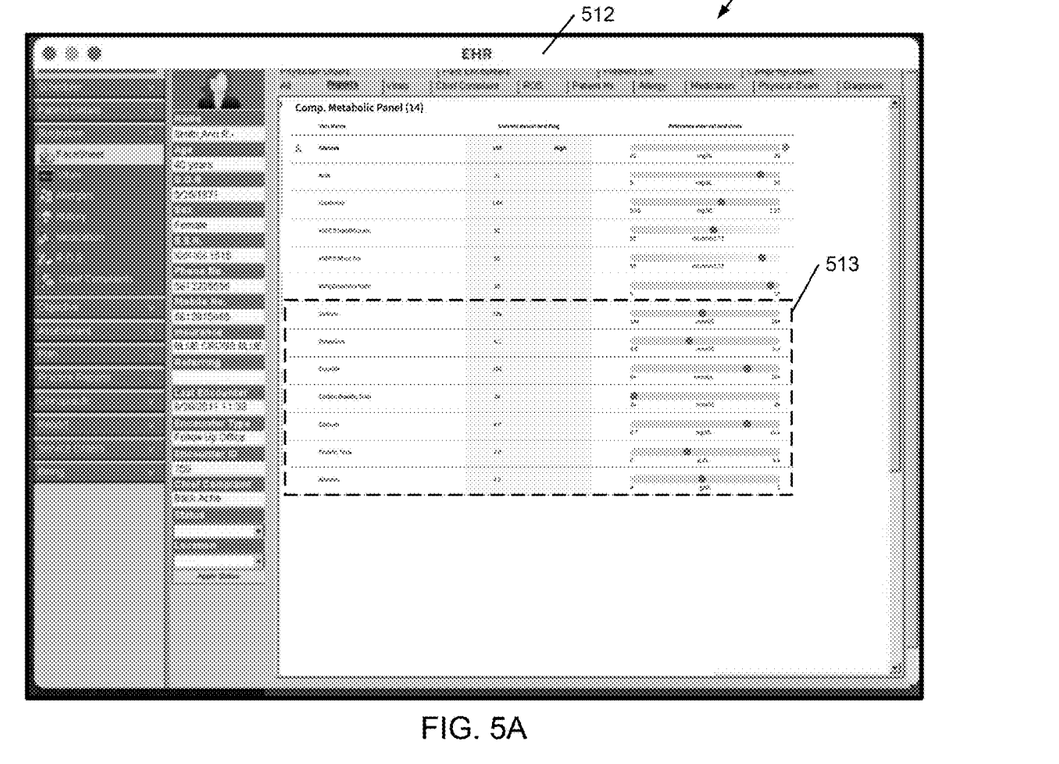
FIGS. 5A-5B show examples of a user's monitor and values used to complete fields in the form-based application, according to an embodiment of the present invention.
Figure 5B:
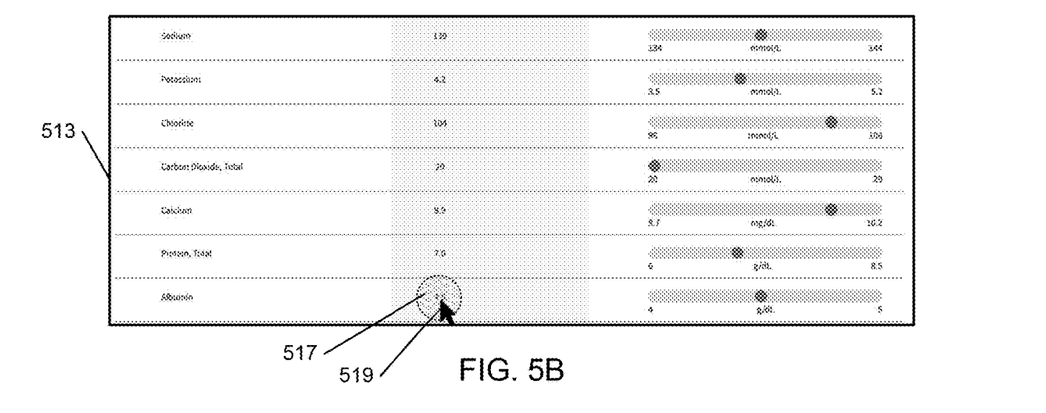

In operation 224, UI application 30 draws or generates a transparent layer on the user's computer monitor 502 (see FIG. 5A). The transparent layer captures an image of the information on the user's monitor, including second application 512, from which the user may fill in or complete the form fields. In operation 226, user 5 clicks or drags the region on the monitor (and, thus, the transparent layer) within second application 512 that the user wants to use to input data into the field. FIG. 5B shows portion 513, a blown-up part of second application 512 that shows part of the CMP-14 (comprehensive metabolic panel) information for a subject in an EHR application, including readings for Sodium, Potassium, Chloride, Carbon Dioxide, Calcium, Protein, and Albumin. This figure also shows cursor (arrow) 519 indicating user 5 selecting the Albumin reading, "4.5," to be entered into field 401 in FIG. 4A as "Albumin."

Figure 4B:
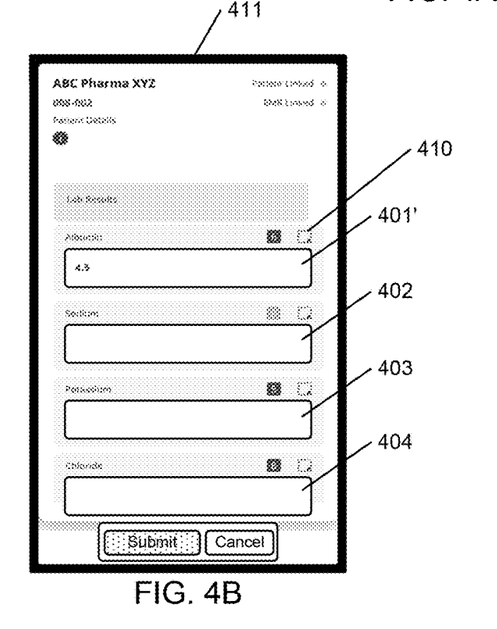

Operations 228-236 describe how pointing to "4.5" completes field 401. In operation 228, UI application 30 creates an image area 517 of pre-determined size within the transparent layer around where user 5 clicked or dragged (using the click or drag coordinates). Image area 517 may, for example, include all of the text near the clicked area plus white space (e.g., 10 pixels) around the text. In operation 230, UI application 30 requests text recognition for the image area in the transparent layer. This may be provided by external recognition service 35 (see FIG. 1), such as Amazon Web Services (AWS) Rekognition. Amazon Rekognition, which resides on the "cloud" (i.e., via the Internet or other network), can identify objects, people, text, scenes, and activities in images and videos. In operation 232, recognition service 35 takes image area 517 and extracts, i.e., processes and/or recognizes, the text and/or data (i.e., text, data, or both text and data) within that area. In this case, recognition service 35 extracts "4.5." In operations 234-236, recognition service 35 returns the text and/or data identified from image area 517 and loads it into UI application 30 to be entered into input window 411, as shown in field 401' in FIG. 4B. In one embodiment, recognition service 35 may process the whole transparent layer rather than just an area of the layer. Note that such a large processing area usually takes more time and may implicate privacy concerns if large amounts of text and data from medical records are transmitted over the Internet. In another embodiment, recognition service 35 may be a local service rather than a cloud-based service like Amazon Rekognition. This reduces the privacy concerns and the reliance on a separate service.

Figure 4C:
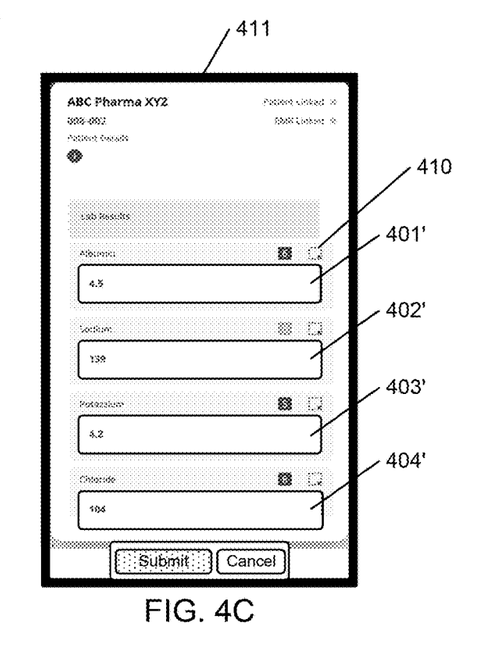

In one embodiment, operations 222-236 are repeated for each field to be completed. In another embodiment, operations 222 and 226-236 are repeated, but the transparent layer in operation 224 does not need to be generated again. In the examples shown in FIGS. 4A-4C, user 5 clicks on the values for Sodium, Potassium, and Chloride to complete fields 402-404. The result is shown in FIG. 4C, which includes values for each of these entries in fields 402'-404'. In the event input window 411 includes drop-down lists or selections, checkboxes, photo or document upload fields, or radio buttons that are transferred from initial web form 11, these elements may be completed directly by the user in UI application 30 without going through the recognition service.

Figure 3B:
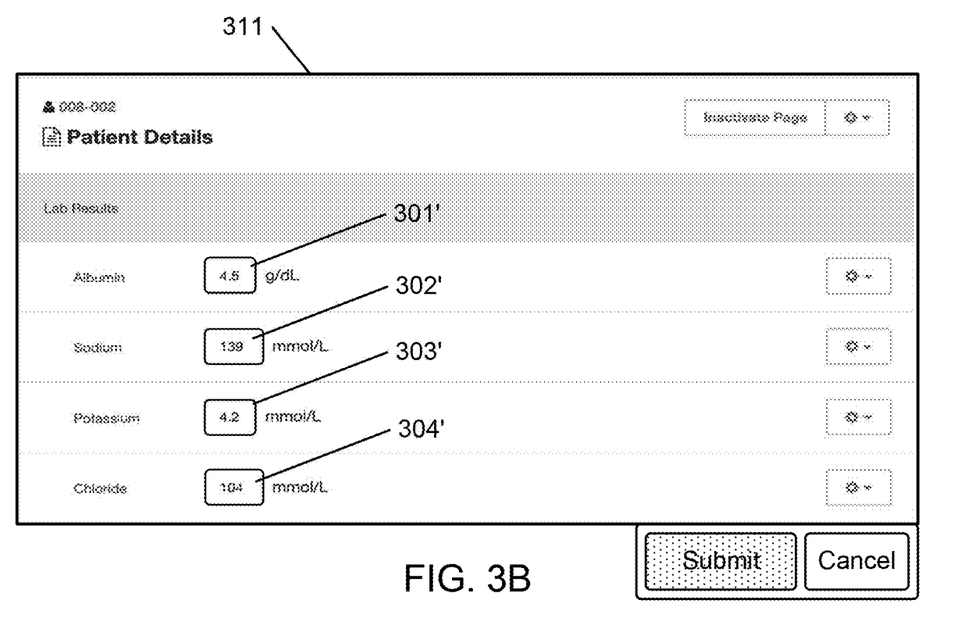

At this point, the "click" and "connect" methods converge, so the "click" method proceeds to operation 262 in FIG. 2A. Once all of the fields in input window 411 are completed, in operation 262, user 5 clicks the "Submit" button in input window 411 (FIG. 4C). In another embodiment, there is no "Submit" button and the information transfers automatically, which may be facilitated by synching in real time the input window and the EDC form. In operation 264, the data are sent back through WebSocket server 20 to browser plug-in 10. In operation 266, HTML form 311 gets loaded with the values in fields 301'-304', as shown in FIG. 3B. This loads those values into form 11 in form-based application 101.

Figure 6A:
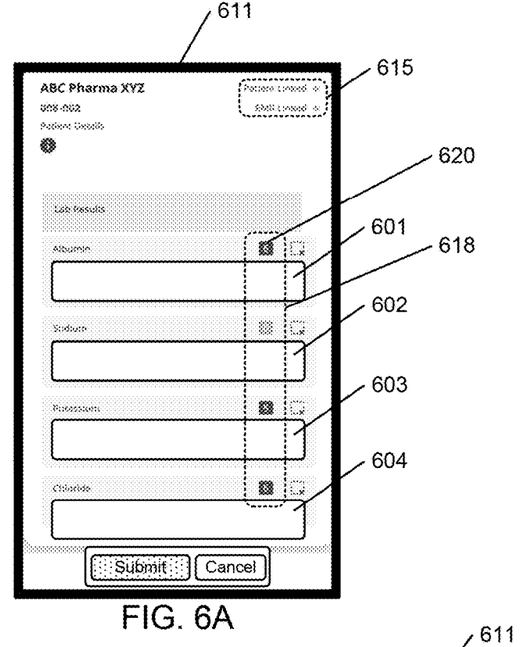
FIGS. 6A-6C show another method of using a generated input window to complete fields in the form-based application, according to an embodiment of the present invention.

The "connect" method operates somewhat differently—it involves the ability to link or connect the form-based application and the EHR/EMR system via UI application 30 to facilitate transfer. However, the "connect" method still generates an input window like that of the "click" method. FIG. 6A is an example showing how data and elements from form-based application 101 are used to generate such an input window to be filled in. Input window 611 includes the same fields that come from form 11 and provides a link or connection between UI application 30 and form-based application 101. FIG. 6A shows icons 620 (with numbers in them) that indicate the "connect" functionality is available; the numbers in the icons indicate how many datapoints are available for the specific field. A user clicking on icon 620 activates the operations in which the user can then select a data point in the second application (e.g., an application on user's monitor 102 or EHR/EMR system 103).

FIG. 2C shows flowchart 240, which includes operations more specific to the "connect" method. As a first action, this method determines whether UI application 30 and the EHR/EMR system are linked for a specific patient, that is, connected to each other to facilitate communication and transfer of the patient's information. Accordingly, in operation 242, UI application 30 requests the data availability status from EHR/EMR data service 45, which serves as a conduit between UI application 30 and EHR/EMR system 103. Operation 244 asks whether the data are available, that is, whether UI application 30 and the EHR/EMR system are linked or connected, and whether they are linked for a specific patient. If so, input window 611 will indicate in area 615 that both the patient and the EHR/EMR system are linked.

The notation "EMR Linked" in area 615 refers to confirmed connectivity to a disparate application so that data from that application can be made available to a user in the input window. In this embodiment, the disparate application is an EHR/EMR system 103 that is connected via a separate and independent process whereby doing so enables EHR/EMR data service 45 to generate a request and receive data from the EHR/EMR system via APIs. Once connectivity is established with the EHR/EMR system, it is recorded in the EHR/EMR data service, which allows UI application 30 to indicate to the user that the "connect" functionality is available.

If the patient and the EHR/EMR system are so linked, EHR/EMR data service requests EDC form text and/or data from EHR/EMR system 103 (i.e., UI application requests the EDC form text and/or data from the EHR/EMR via the EHR/EMR data service 45) and sends the text and/or data to UI application 30 in operation 246. In operation 248, UI application 30 presents the EHR/EMR text and/or data to user 5 to select appropriate text and/or data for the EDC form field. FIG. 6A shows that input window 611 indicates the fields from the EDC form and, in area 618, the number of datapoints for each field found in the EHR/EMR system for the specific patient. Thus, FIG. 6A shows that the system found 6 albumin readings, 0 sodium readings, 5 potassium readings, and 6 chloride readings.

Figure 6B:
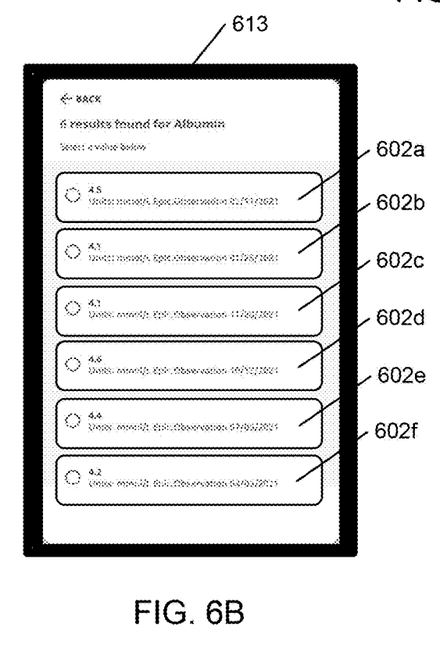
Figure 6C:
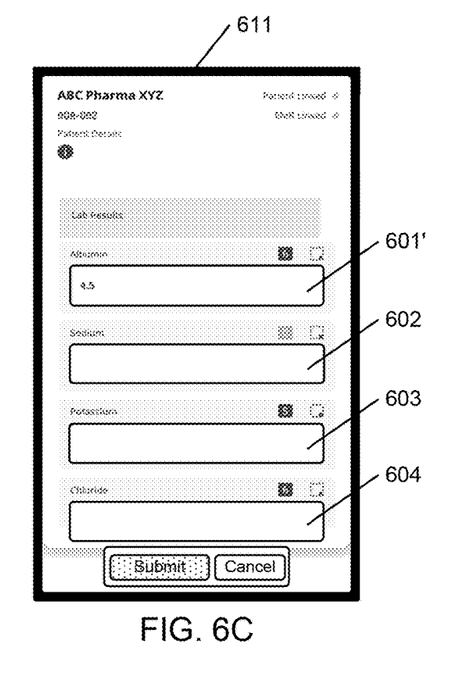

User 5 can click on any of the fields having one or more readings, and the system will present the readings as shown in input window 613 in FIG. 6B. That figure shows six albumin readings 602a-602f for the specific patient, and the readings include the values as well as the dates of the readings. User 5 then selects one of the readings. In operation 250, the selected reading is loaded into UI application 30 to be entered into input window 611, as shown in field 601' in FIG. 6C. This field now includes the value 4.5 for albumin, which corresponds to the first reading shown in FIG. 6B.

Referring back to FIG. 2C and operation 244, if the data are not available because the patient is not linked to UI application 30 via a disparate application, e.g., the EHR/EMR system (a condition which would be indicated in area 615), this link or connection would need to be established. In such a case, the disparate application, e.g., the EHR/EMR system 103, is connected via a process to enable the EHR/EMR data service 45 to generate a request and receive data from the EHR/EMR system via APIs. In operation 252, UI application 30 requests a Medical Record Number (MRN) from the User for the EDC form patient and sends it to EHR/EMR data service 45. An MRN is a unique identifier assigned by a service provider to reference a single patient. In operation 254, EHR/EMR data service 45 then requests and retrieves EHR/EMR data from EHR/EMR system 103. In operation 256, UI application 30 requests identifying data from the User, such as date of birth, gender, etc., and compares those data to the EHR/EMR identifying data. If the identifying data from the User match those from the EHR/EMR system, then the patient is matched in operation 258 and the data are available. The flow then proceeds to operation 246 as discussed above. In embodiments, similar connection processes may be performed for disparate systems other than EMR/HER systems.

Besides the operations shown in FIGS. 2A-2C, other operations or series of operations are contemplated to transfer data between applications to complete fields in a form-based application. As described above, some or most of operations 222-236 may be repeated for each field to be completed. Moreover, the actual orders of the operations in the flowcharts in FIGS. 2A-2C are not intended to be limiting, and the operations may be performed in any practical order. For example, a transparent layer is generated in operation 224, but that layer may be generated earlier in the process.

In sum, the invention facilitates transfer of data to a form-based application from an external source, such as another application or an EHR/EMR system, without manually entering the data. Besides eliminating manual entry, the invention does not require actual integration between the form-based application and the external source. It is easy to implement this solution compared to previous solutions and can be used "out of the box" with no modifications made by the user to either the form-based application or the external source.

Aspects of the present invention may be embodied in the form of a system, a computer program product, or a method. Similarly, aspects of the present invention may be embodied as hardware, software, or a combination of both. Aspects of the present invention may be embodied as a computer program product saved on one or more computer-readable media in the form of computer-readable program code embodied thereon.

The computer-readable medium may be a computer-readable storage medium. A computer-readable storage medium may be, for example, an electronic, optical, magnetic, electromagnetic, infrared, or semiconductor system, apparatus, or device, or any combination thereof.

Computer program code in embodiments of the present invention may be written in any suitable programming language. The program code may execute on a single computer or on a plurality of computers. The computer may include a processing unit in communication with a computer-usable medium, where the computer-usable medium contains a set of instructions, and where the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method for completing a field in a form-based application, the method comprising:
   extracting form data and elements from a form within the form-based application, the form data and elements relating to at least one first field;
   generating an input window containing the form data and elements, including at least one second field corresponding to said at least one first field;
   receiving input from an external source providing text and/or data, the input comprising one or more datapoints, from an electronic health records or electronic medical records (EHR/EMR) system via an EHR/EMR data service based on a determination that a link is established to the EHR/EMR system;
   providing an indication of a number of said one or more datapoints available for each respective field, of said at least one second field, based on the input received from the electronic health records or electronic medical records (EHR/EMR) system;
   receiving input identifying said at least one second field for which to fill in the provided text and/or data;
   presenting, to a user, the available datapoints associated with the identified second field;
   receiving input, from the user, identifying a selected datapoint of said available datapoints associated with the identified second field;
   loading the provided text and/or data corresponding to the user selected datapoint associated with the identified second field into the second field in the input window; and
   transferring the loaded text and/or data from the second field to the first field within the form-based application,
   wherein said receiving input from the external source comprises retrieving the text and/or data from the input received from the electronic health records or electronic medical records (EHR/EMR) system via the EHR/EMR data service.

2. The method of claim 1, wherein said receiving input from the external source comprises extracting the text and/or data from an area of the user's monitor.

3. The method of claim 2, wherein said extracting the text and/or data from the area of the user's monitor comprises sending a request to a service that performs recognition of text and/or data.

4. The method of claim 2, further comprising generating a transparent layer on the user's monitor, the transparent layer defining an image area containing an image of the text and/or data to be extracted.

5. The method of claim 4, wherein said generating the transparent layer on the user's monitor comprises forming the defined image area around the text and/or data to be extracted based on where the user has clicked.

6. The method of claim 1, wherein, based on a determination that a link is not established to the EHR/EMR system, the method further comprises:
   requesting from the user, via a user interface, a Medical Record Number (MRN) uniquely identifying a patient;
   sending the MRN to the EHR/EMR data service;
   retrieving identifying data for the patient via the EHR/EMR data service;
   retrieving identifying data for the patient from the user via the user interface; and
   establishing the link to the EHR/EMR system based at least in part on a comparison of the identifying data for the patient retrieved via the EHR/EMR data service with the identifying data for the patient retrieved via the user interface.

7. The method of claim 1, wherein, in said extracting, a browser plug-in or extension parses the form from the form-based application and extracts the form data and elements from the form.

8. The method of claim 7, wherein the browser plug-in or extension is registered to operate on a form from a specific uniform resource locator (URL).

9. The method of claim 7, further comprising transmitting the form data and elements from the browser plug-in or extension to a WebSocket server.

10. The method of claim 9, wherein, in said receiving input from the external source, the browser plug-in or extension receives the provided text and/or data from the Web Socket server.

11. The method of claim 10, wherein, in said transferring, the browser plug-in or extension transfers the extracted text and/or data to the first field within the form-based application.

12. The method of claim 1, wherein the input window comprises a link indicator indicating whether the link is established to the EHR/EMR system.

13. A method for completing a field in a form-based application with text and/or data from an electronic health records or electronic medical records (EHR/EMR) system, the method comprising:
    extracting form data and elements from a form within the form-based application, the form data and elements relating to at least one first field;
    generating a first input window containing the form data and elements, including at least one second field corresponding to said at least one first field;
    receiving input from an external source providing the text and/or data from the electronic health records or electronic medical records (EHR/EMR) system, the input comprising one or more datapoints associated with the patient, each datapoint comprising a clinical reading of the patient;
    providing an indication of a number of datapoints available for each respective field of said at least one second field based on the input from the external source;
    receiving input identifying said at least one second field for which to fill in the provided text and/or data;
    presenting, to a user, the available datapoints associated with the identified second field;
    receiving input, from the user, identifying a selected datapoint of said available datapoints associated with the identified second field;
    loading a clinical reading of the patient corresponding to the user-selected datapoint associated with the identified second field, into the identified second field in the first input window; and
    transferring the loaded clinical reading from the second field to the first field within the form-based application.

14. The method of claim 13, wherein said presenting said one or more datapoints to the user comprises displaying said one or more datapoints in a second input window.

15. The method of claim 14, wherein said receiving input identifying the selection of the datapoint of said one or more datapoints comprises accepting a user selection of a defined region, button, or icon of the second input window associated with the selected datapoint.

16. The method of claim 13, wherein each clinical reading is associated with a date that the clinical reading was performed on the patient.

17. A system for completing a field in a form-based application, comprising:
    a browser plug-in or extension to parse a form from the form-based application and extract form data and elements from the form, the form data and elements relating to at least one first field;
    a WebSocket server to receive the form data and elements from the browser plug-in or extension; and
    a user-interface-based application to:
        generate an input window containing the form data and elements, including at least one second field corresponding to said at least one first field;
        receive input from an external source providing text and/or data, the input comprising one or more datapoints, from an electronic health records or electronic medical records (EHR/EMR) system via an EHR/EMR data service based on a determination that a link is established to the EHR/EMR system;
        provide an indication of a number of datapoints available for each respective field of said at least one second field based on said input received from the electronic health records or electronic medical records (EHR/EMR) system;
        receive input identifying said at least one second field for which to capture data;
            presenting, to a user, the available datapoints associated with the identified second field;
            receiving input, from the user, identifying a selected datapoint of said available datapoints associated with the identified second field;
        load the provided text and/or data corresponding to the user selected datapoint associated with the identified second field, into the second field in the input window,
        wherein the WebSocket server transmits the provided text and/or data to the browser plug-in or extension; and
        the browser plug-in or extension transfers the provided text and/or data to the first field within the form-based application.

18. The system of claim 17, wherein the browser plug-in or extension is registered to operate on a form from a specific uniform resource locator (URL).

19. The system of claim 17, wherein the input window comprises a link indicator indicating whether the link is established to the EHR/EMR system.

20. A system for completing a field in a form-based application with text and/or data from an electronic health records or electronic medical records (EHR/EMR) system, the system comprising at least one processor and memory storing instructions which when executed cause said at least one processor to perform:
    extracting form data and elements from a form within the form-based application, the form data and elements relating to at least one first field;
    generating a first input window containing the form data and elements, including at least one second field corresponding to said at least one first field;
    receiving input from an external source providing the text and/or data, the input comprising one or more datapoints associated with the patient, each datapoint comprising a clinical reading of the patient;
    providing an indication of a number of datapoints available for each respective field of said at least one second field based on the input from the external source;
    receiving input identifying the second field, of said at least one second field, for which to fill in the provided text and/or data;
    presenting, to a user, the available datapoints associated with the identified second field;
    receiving input, from the user, identifying a selected datapoint of said available datapoints associated with the identified second field;
    loading a clinical reading of the patient corresponding to the user-selected datapoint associated with the identified second field, into the identified second field in the first input window; and
    transferring the loaded clinical reading from the second field to the first field within the form-based application.

* * * * *